United States Patent Office 3,435,777
Patented Apr. 1, 1969

3,435,777
PUMP, PARTICULARLY HYDRAULIC PUMP FOR DRILLING PLANT
Martin Schaaf, Erkelenz, Rhineland, Germany, assignor to Maschinen- und Bohrgerate-Fabrik Alfred Wirth & Co., K.G., Erkelenz, Rhineland, Germany, a German company
Filed May 15, 1967, Ser. No. 638,264
Claims priority, application Germany, May 20, 1966, M 69,557
Int. Cl. F04b 21/02, 21/08
U.S. Cl. 103—217   3 Claims

ABSTRACT OF THE DISCLOSURE

A pump, particularly for a drilling plant in which an opening in the housing thereof is sealed by a closure member by the cooperation of a number of clamping devices which are simultaneously actuatable by pressure medium to clamp the closure member against the opening. The application of the pressure medium is then discontinued and a mechanical clamping means for each of the clamping devices is operated to maintain the clamping pressure previously applied by the pressure medium. A common source of pressure medium communicates with all the clamping devices.

---

The invention relates to a pump, particularly a hydraulic piston pump for a drilling plant, in which there is provided, for closing an opening of a housing, e.g. of a valve chamber or a cylinder, a cover, flange or the like which can be moved into the required position for sealing the opening by screwing; the cover or flange can be pressed into its position for sealing the opening by a clamping device, which is equipped with pistons actuatable by a pressure medium and with mechanical means which are adapted to maintain the clamping pressure applied by the pistons when the pistons are no longer acted on by the pressure medium.

A closure device is known (cf. German patent specification No. 1,072,031) which comprises an outer supporting cover and an inner cover which is pressed, by a pressure medium which is introduced between the two parts, against a sealing ring which surrounds the opening in the housing which is to be closed. The supporting cover has an external screw thread and is directly screwed to the housing or to a ring connected to the housing.

The supporting cover also comprises a central tightening screw which can be screwed deeper into the supporting cover, when an appropriate hydraulic pressure is operative, and thereby hold the inner cover in its clamped position when the hydraulic pressure is no longer operative. This known arrangement employs a special form of closure which, inter alia, has two separate covers and a piston arranged. The larger the opening to be sealed, the heavier all the above-mentioned parts must be in consequence of the load which is effective on the total surface in each particular instance.

The present invention takes advantage of the above-mentioned principle of applying a clamping force via a pressure medium and subsequently maintaining this clamping force by mechanical means, and comprehends a pump in which the openings can be closed, or parts clamped in position, rapidly, reliably and with a uniform distribution of the pressure, and without the necessity of using more than one closure cover for this purpose.

To this end, it is proposed according to the invention that each one of a plurality of threaded pins or bolts serving to locate the cover flange or the like has a clamping device asociated therewith and the clamping devices are connected to a common supply line for the application of the pressure medium.

The invention enables a closure to be provided which is simple and uncomplicated, in relation to the pressures and other forces involved, and which is obtained by the use of well-tried and appropriate connecting means such as screw-threaded parts, locating bolts and the like, and which succeeds in eliminating the drawbacks associated with the prior art constructions. It has previously been necessary, when attaching a closure cover by means of threaded pins or bolts which are regularly distributed over the periphery, to tighten the individual nuts engaging the pins in succession with a spanner. It was not in practice possible to observe an exact degree of tightness of these nuts owing to the unspecified frictional conditions. Also, it was very difficult or absolutely impossible to clamp the closure cover into its required centralized position thus resulting in bending stresses in the screw-threaded elements which entailed the risk of breakage and of interruption in drilling work.

In the case of hydraulic pumps for a rotary drilling plant and the like, with which the invention is particularly concerned, requirements extend far beyond the normal ones owing to the high pressures involved and the peculiar conditions of drilling work. The constantly increasing depths which modern drilling equipment must reach requires an increase in the pressures of the pumps, which in turn means that the closure covers sealing the different openings of the pumps must be more strongly clamped in position. The known means for manually tightening the covers onto their associated openings are no longer adequate.

The invention is characterized by the great advantage that it is possible to use screw-threaded members as an appropriate means for locating an individual closure cover, so that these screw-threaded elements can be tightened rapidly and with uniform and precisely defined force, whereby the cover, flange or the like can be readily clamped in its central position relative to the opening to be sealed. It is particularly important with hydraulic pumps that when necessary the closure cover should be susceptible of being rapidly removed, placed back again and clamped in place; this is because parts inside the pump frequently have to be replaced when worn, and it is of importance on these occasions to interrupt drilling work only to the minimum possible extent.

According to a preferred embodiment of the invention, the cylinder spaces which accommodate the pistons of the clamping devices are arranged in the closure covers, flanges or the like per se; a compact, space-saving and robust form of construction is achieved in this way. Other modes of construction are not ruled out in principle; for example, the cylinder units could be positioned in a corresponding number on the closure cover or flange. In this way, closure covers already in use could be fitted with the novel means proposed according to the invention.

According to one embodiment of the invention, a pressure medium line communicating with the clamping device is disposed in the closure cover or flange; this provides a closed or sealed-in form of construction in which the pressure medium line is protected from damage. In particular the pressure medium line can be constituted by an annular groove in the cover or flange which is, for example, formed by machining on a lathe and then closed from the outside by welding.

Embodiments of the invention are described below with reference to the accompanying drawings in which.

Figure 1:
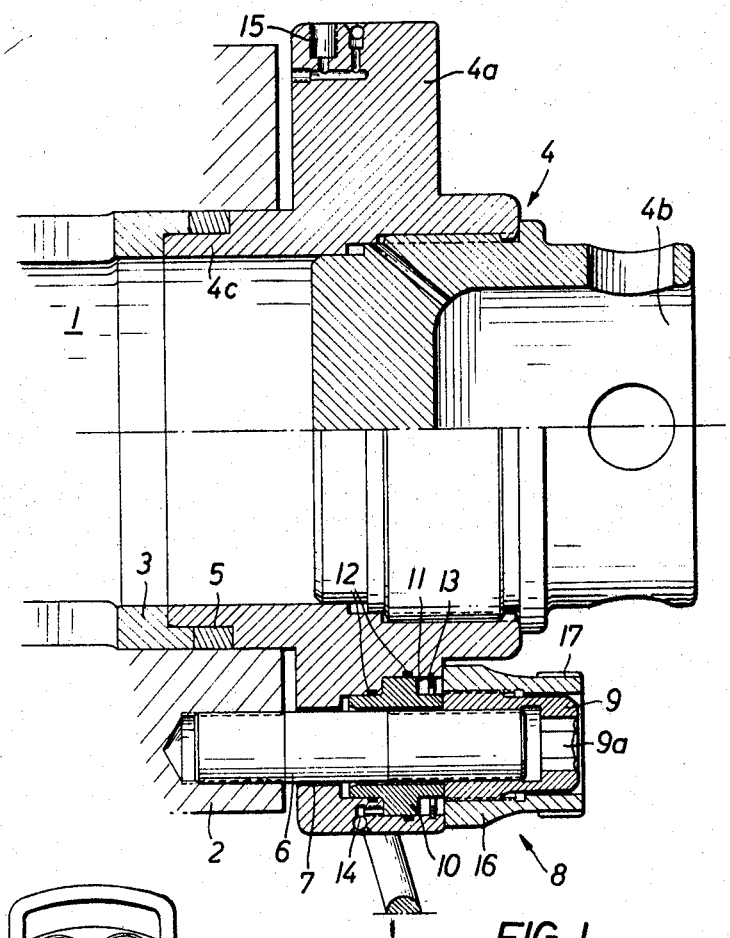
FIGURE 1 shows the manner of closure of an opening of a cylinder space, the view being taken along line I—I of FIGURE 2 and being on an enlarged scale.
Figure 2:
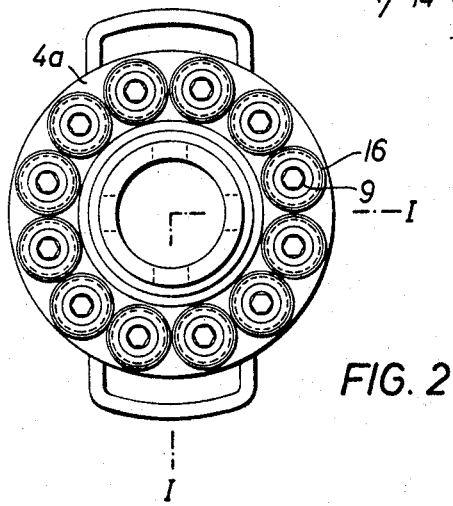
FIGURE 2 is a plan view of the closure cover.
Figure 3:
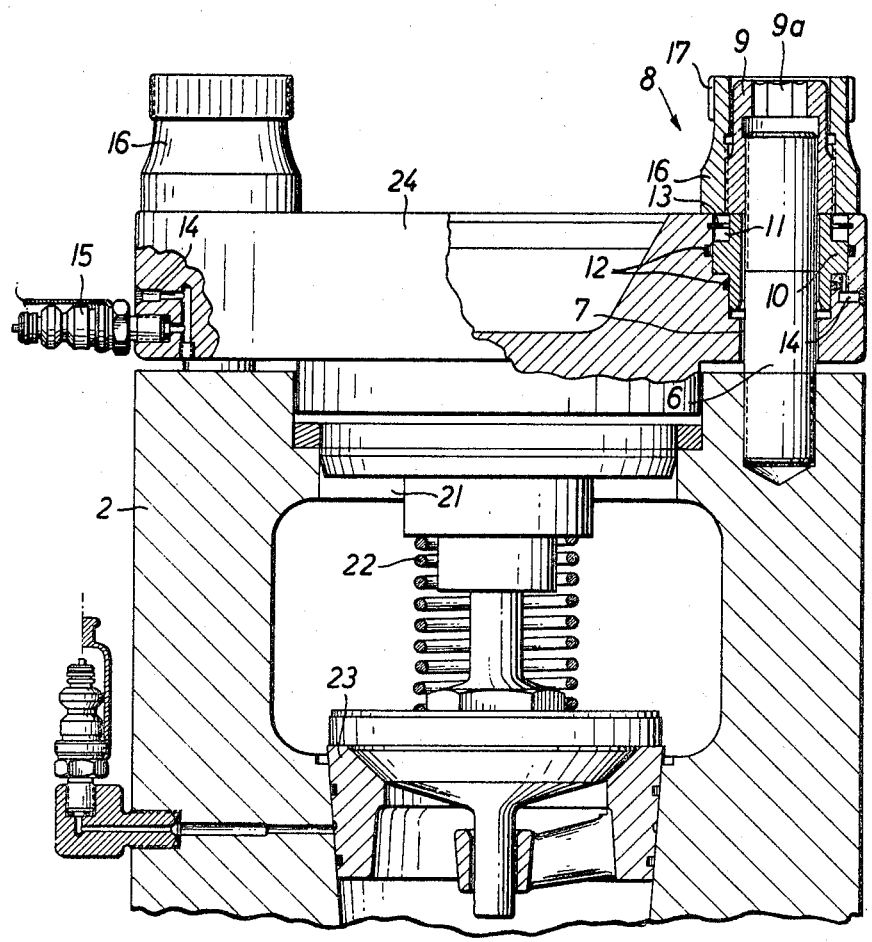
FIGURE 3 is a view partly in section and partly in elevation, of the closure means sealing the opening of a suction valve chamber of a high pressure pump.

In FIGURE 1 can be seen the end of a cylinder space 1 of a high pressure piston pump for a drilling plant provided with a cylindrical bushing 3 received by a pump housing 2. The opening of the pump housing is sealed by a closure cover denoted generally 4, which in the embodiment shown consists of an outer, annular part 4a and a part 4b screwed therewith. According to particular requirements, the closure cover may also be a single part as shown in the embodiment of FIGURE 3. A shoulder 4c of the annular part 4a engages in the bore of the pump housing 2 and at the same time serves to locate and fix the cylindrical bushing 3, which has a shoulder (not shown) by means of which it is supported against a shoulder of the pump housing. 5 indicates a sealing element.

For fixing the closure cover 4 to the pump housing 2, twelve spacer or locating bolts 6 are screwed into bores of the housing 2 and extend through bores 7 of the cover part 4a. Each locating bolt has associated therewith a clamping device which is generally designated as 8 and which will be later more fully described.

On the outer threaded end of each bolt 6 engages a sleeve 9, which is provided with an internal hexagonal surface 9a serving as gripping means for the insertion therein of a spanner or wrench and which also functions as an abutment for an annular stepped piston 10 which is slidably arranged in a stepped bore 11 located in the cover part 4a and which communicates with the through bore 7. The bores 11 which have seals 12 thus form cylinder spaces to which a pressure medium, e.g. oil can be fed, via a common supply line, from a source of pressure medium (not shown) and which may be, for example, a hand pump. Spring rings 13 prevent the pistons 10 from falling out when the sleeves 9 are unscrewed and removed.

The pressure medium supply line is constituted by an annular duct formed in the cover part 4a, to which pressure medium is fed via a connection 15. A manometer (not shown) is connected to a pressure medium annular channel 14 and may be calibrated in units of force taking into account the working surfaces of the pistons of the clamping devices 8.

The sleeve 9 forming part of each clamping device 8 and serving as abutment surface for the piston 10 is provided with an external screw thread over part of its length. A nut 16 is threaded onto this external screw thread and includes a milled surface, and teeth 17 or surfaces which can be gripped by a spanner or wrench. The nuts 16 constitute the mechanical means for maintaining the pressure on the closure covers after the pressure medium (e.g. oil) is no longer applied to the covers; they can be brought into pressing contact, without strain being thereby caused, with the upper side of the closure cover by simply drawing up the bolts.

The device works in the following manner: Pressure medium is fed to the annular channel 14 so that the piston 10 is actuated and the necessary clamping force is applied. The applied force is transmitted from the pistons 10 to the housing 2 via the abutment sleeve 9 and threaded bolts 6, with the closure cover 4 being thereby pressed onto the housing. When the pre-determined pressure has been reached, as indicated on the calibrated manometer, the nuts freely arranged on the sleeves 7 are screwed by hand until they come into engagement with the outer, flat surface of the closure cover 4. The pistons can now be relieved from the pressure of the actuating medium (e.g. hydraulic), with the nuts 16 now serving to maintain mechanically the pressure which was originally applied by the pressure medium.

The connection can naturally be discontinued by the reverse sequence of operations, i.e. the pressure medium (e.g. hydraulic) is applied to the pistons 10 until the nuts 16 can be readily loosened.

The sealing closure of the valve chamber of the drilling plant can be effected in analogous manner, as shown in FIGURE 3. In FIGURE 3 cylindrical projections of a one-piece closure cover 24 engage in a bore 21 of the pump housing 2 and at the same time serve as a supporting surface for a loading spring 22 of a tapered part 23 of the valve. Otherwise the individual clamping devices 8 are analogous to those shown in FIGURE 1, and do not require further description; similar parts in the two figures are designated by the same reference numerals.

Insofar as this is possible in view of the prior art, all features mentioned in the above description and shown in the accompanying drawings are to be regarded as forming, either separately or in combination part of the invention, even if they are not expressly mentioned in the appended claims.

I claim:

1. In a pump and more particularly a hydraulic pump for a drilling plant, a housing having an opening leading to a chamber therein and means for closing said opening, said closing means comprising a cover member and threaded fastening means for securing the cover member onto the housing, each of said threaded fastening means having an individual clamping device permanently associated therewith, each clamping device including a cylinder, a piston in the cylinder actuable by a pressure medium, and mechanical means for maintaining the clamping pressure applied by the piston when the piston is no longer subject to the pressure medium, and all of said clamping devices being connected to a common supply line for application of a pressure medium.

2. The pump as claimed in claim 1, in which the cylinders accommodating the pistons of the clamping devices are arranged in the cover member per se.

3. The pump as claimed in claim 1 in which said common supply line communicating with the clamping devices is arranged in the cover member per se.

References Cited

UNITED STATES PATENTS 2,304,992  12/1942  Foster _____ 103—216 XR
2,499,614   3/1950  Thornhill _____ 103—228

ROBERT M. WALKER, *Primary Examiner.*

U.S. Cl. X.R.

103—228; 220—3